United States Patent
Kazmi et al.

(10) Patent No.: US 11,026,229 B2
(45) Date of Patent: Jun. 1, 2021

(54) METHOD AND APPARATUS FOR TRANSMITTING AND RECEIVING SIGNALS IN A FREQUENCY BAND

(71) Applicant: Telefonaktiebolaget LM Ericsson (publ), Stockholm (SE)

(72) Inventors: Muhammad Kazmi, Stockholm (SE); Johan Bergman, Stockholm (SE); Gary Boudreau, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 657 days.

(21) Appl. No.: 15/207,182

(22) Filed: Jul. 11, 2016

(65) Prior Publication Data
US 2016/0323885 A1    Nov. 3, 2016

Related U.S. Application Data

(63) Continuation-in-part of application No. PCT/EP2016/052078, filed on Feb. 1, 2016.
(Continued)

(51) Int. Cl.
*H04W 72/04* (2009.01)
*H04L 5/14* (2006.01)
(Continued)

(52) U.S. Cl.
CPC ........... *H04W 72/0453* (2013.01); *H04L 5/14* (2013.01); *H04L 5/143* (2013.01); *H04W 52/367* (2013.01);
(Continued)

(58) Field of Classification Search
CPC ........... H04W 72/085; H04W 72/0453; H04W 76/046; H04W 52/367; H04W 88/02;
(Continued)

(56) References Cited

U.S. PATENT DOCUMENTS 8,509,792 B1 * 8/2013 Oroskar ............... H04W 72/02
 455/450
8,520,586 B1 * 8/2013 Husted ................. H04W 74/08
 370/318
(Continued)

FOREIGN PATENT DOCUMENTS

CN   1734983 A   2/2006
CN  101401338 A  4/2009
(Continued)

OTHER PUBLICATIONS

Folkeson, WCDMA User Equipment Output Power Calibration (Year: 2003).*
(Continued)

*Primary Examiner* — Vinncelas Louis
(74) *Attorney, Agent, or Firm* — Murphy Bilak & Homiller, PLLC

(57) ABSTRACT

There is provided a method and apparatus for transmitting and receiving signals in a frequency band in a wireless communications network. The method includes determining a frequency separation between a frequency of a transmit signal and a frequency of a receive signal within the frequency band based on at least one of a power of the transmit signal, a number of physical channels associated with the transmit signal, and a number of physical channels associated with the receive signal. The method further includes transmitting and receiving signals in the frequency band in accordance with the determined frequency separation. The method may be performed by a User Equipment of a Network Node.

20 Claims, 7 Drawing Sheets

Related U.S. Application Data

(60) Provisional application No. 62/110,928, filed on Feb. 2, 2015.

(51) Int. Cl.
*H04W 76/27* (2018.01)
*H04W 52/36* (2009.01)
*H04L 5/00* (2006.01)
*H04W 88/02* (2009.01)

(52) U.S. Cl.
CPC ............ *H04W 76/27* (2018.02); *H04L 5/0066* (2013.01); *H04W 88/02* (2013.01)

(58) Field of Classification Search
CPC .......... H04W 74/08; H04L 5/143; H04L 5/14; H04L 5/0066; H04B 1/525; H04B 7/2615
See application file for complete search history.

(56) References Cited

U.S. PATENT DOCUMENTS

| | | | | |
|---|---|---|---|---|
| 2007/0286156 A1* | 12/2007 | Gormley | ............... | H04B 7/2615 370/350 |
| 2012/0075989 A1 | 3/2012 | Roessel et al. | | |
| 2012/0076056 A1* | 3/2012 | Tillman | ............... | H04W 72/085 370/281 |
| 2014/0066057 A1 | 3/2014 | Kazmi et al. | | |
| 2014/0113576 A1* | 4/2014 | Nentwig | ............... | H04B 1/525 455/84 |
| 2015/0124661 A1* | 5/2015 | He | ............... | H04L 5/0066 370/278 |

FOREIGN PATENT DOCUMENTS

| | | | | |
|---|---|---|---|---|
| CN | 103797736 A | 5/2014 | | |
| CN | 103797865 A | 5/2014 | | |
| WO | WO-2012150887 A1 * | 11/2012 | ............ | H04W 28/18 |

OTHER PUBLICATIONS

ETSI, "LTE; Evolved Universal Terrestrial Radio Access (E-UTRA); User Equipment (UE) radio transmission and reception (3GPP TS 36.101 version 12.5.0 Release 12)", ETSI TS 136 101 V12.5.0, Nov. 2014, 1-538.

Unknown, Author, "Impact of UE Self-interference on LTE FD-FDD operation", 3GPP TSG RAN WG4 (Radio) Meeting #46bis, R4-080708, Motorola, Shenzhen, P. R. China, Mar. 31-Apr. 5, 2008, 1-16.

* cited by examiner

Fig. 2

Table 5.7.4-1: Default UE TX - RX Frequency Separation

| E-UTRA Operating Band | TX-RX Carrier Centre Frequency Separation |
|---|---|
| 1 | 190 MHz |
| 2 | 80 MHz |
| 3 | 95 MHz |
| 4 | 400 MHz |
| 5 | 45 MHz |
| 6 | 45 MHz |
| 7 | 120 MHz |
| 8 | 45 MHz |
| 9 | 95 MHz |
| 10 | 400 MHz |
| 11 | 48 MHz |
| 12 | 30 MHz |
| 13 | -31 MHz |
| 14 | -30 MHz |
| 17 | 30 MHz |
| 18 | 45 MHz |
| 19 | 45 MHz |
| 20 | -41 MHz |
| 21 | 48 MHz |
| 22 | 100 MHz |
| 23 | 180 MHz |
| 24 | -101.5 MHz |
| 25 | 80 MHz |
| 26 | 45 MHz |
| 27 | 45 MHz |
| 28 | 55 MHz |
| 30 | 45 MHz |

Table 2-1: Bandwidth Versus Duplexer Gap for Candidate Bands

| Band Class | Uplink (MHz) | Downlink (MHz) | Bandwidth (MHz) | Duplexer Distance (MHz) | Existing Band Gap (MHz) |
|---|---|---|---|---|---|
| 3 | 1710 - 1785 | 1805 - 1880 | 75 (4.3%) | 95 | 20 |
| 8 | 880 - 915 | 925 - 960 | 35 (3.8%) | 45 | 10 |
| 20 | 832 - 862 | 791 - 821 | 30 (3.5%) | 41 | 11 |

METHOD AND APPARATUS FOR TRANSMITTING AND RECEIVING SIGNALS IN A FREQUENCY BAND

RELATED APPLICATIONS

The present application is a continuation-in-part of PCT Application No. PCT/EP2016/052078, filed 1 Feb. 2016, which claims the benefit of U.S. provisional application No. 62/110,928, filed 2 Feb. 2015. The entire contents of each of the aforementioned applications are incorporated herein by reference.

TECHNICAL FIELD

Embodiments described herein relate to methods and apparatus for transmitting and receiving signals in a frequency band. Embodiments described herein relate to a network node and a User Equipment.

BACKGROUND

Machine-Type Communication

Machine-to-machine (M2M) communication (or also referred to as Machine-type communication (MTC)) is used for establishing communication between machines and between machines and humans. The communication may comprise exchange of data, signaling, measurement data, configuration information, etc. The device size may vary from that of a wallet to that of a base station. The M2M devices are quite often used for applications like sensing environmental conditions (e.g., temperature reading), metering or measurement (e.g., electricity usage, etc.), fault finding or error detection, etc. In these applications the M2M devices are active very seldom but over a consecutive duration depending upon the type of service e.g., about 200 milliseconds, once every 2 seconds, about 500 milliseconds, every 60 minutes, etc. The M2M device may also do measurement on other frequencies or other RATs (Radio Access Technologies).

One category of M2M devices is referred to as a low cost device. For example, the cost reduction can be realized by having just a single receiver in the UE (User Equipment). The cost can be further reduced by having a single receiver and half duplex FDD capability. The latter feature prevents the need for having a duplex filter since the UE does not transmit and receive at the same time.

Another category of M2M devices is required to support enhanced UL (Uplink) and/or DL (downlink) coverage. These devices are installed at locations where path loss between the M2M device and the base station can be very large such as when used as a sensor or metering device located in a remote location such as a basement of a building. In such scenarios the reception of signal from the base station is very challenging. For example, the path loss can be worse than 15-20 dB compared to normal operation. To cope with such challenges, the coverage in uplink and/or in downlink has to be substantially enhanced. This can be realized by employing one or a plurality of techniques in the UE and/or in the radio network node for enhancing the coverage e.g., boosting of DL transmit power, boosting of UL transmit power, enhanced UE receiver, signal repetition, etc.

Narrowband MTC Operation

For narrowband MTC operation, it is possible that the MTC UE can be scheduled with less than 6 physical resource blocks (PRBs) and that a minimum allocation of 1 PRB for both the uplink (UL) and downlink (DL) can be supported. Furthermore, it is expected that retuning of the frequency of MTC UE will be required to support frequency multiplexing of users and to support frequency hopping.

SUMMARY

For existing LTE UE categories, the filtering requirements have been defined based on the transmit-to-receive frequency separation for a given band class (also referred to as frequency band), as defined in Table 5.7.4 of TS36.101 3GPP E-UTRA User Equipment Radio Transmission and Reception version 12.5.0 release 12, as well as the defined RF performance requirements of the given LTE UE category.

The context of the transmit-receive frequency separation is illustrated in FIG. 1, for frequency division duplexing (FDD) operation. FIG. 1 illustrates a narrowband MTC UE transmit-receive frequency separation. Use of a narrower transmit-receive frequency separation than specified in Table 5.7.4 of TS36.101 may result in levels of self-interference between the MTC UE transmitter and receiver that exceed the ability of the filtering requirements of the MTC UE to allow it to meet the needed performance. This may result in degradation in the MTC UE performance (for example, in the error rate performance of the MTC UE, loss of bit rate, throughput) and/or a reduction in the coverage capabilities of the MTC UE. For example, the MTC UE may not be able to operate in cell border region or when it is far from the serving base station. Such a situation can occur if the UL and DL PRB allocations for FD (Full Duplex) FDD transmissions are assigned independently and, for example, with reference to FIG. 1, the assigned UL PRBs are close to the upper edge of the UL band and the assigned DL resources are close to the lower edge of the DL band. In such a case, if the band gap is significantly smaller than the permitted minimum transmit-receive carrier frequency separation, the duplexer filtering may not be sufficient to ensure the specified performance of the UE.

Based on the above new requirements being defined for MTC UE's, the minimum transmit-receive frequency separation may be less than specified in Table 5.7.4 of TS36.101. Furthermore, the MTC UE could also be transmitting with full power in a narrow bandwidth close to the band edge. Table 5.7.4-1 of TS36.101 is shown in FIG. 2.

The present inventors have appreciated that it may be desirable to define a minimum separation between the transmit frequency and receive frequency within the band for narrowband operation of MTC, in order to ensure that the duplexer gap is sufficient to support existing performance requirements. For half-duplex FDD and TDD MTC UE's it is not expected to be an issue; however, full-duplex FDD MTC UE's will need to take in to consideration the transmit-frequency separation impact on RF performance including reference sensitivity and to maintain the required coverage improvements for MTC UEs. If the performance requirements cannot be met by the duplexing for transmit-receive separation of less than a given threshold, it may also be possible to specify a reduction in transmit power to compensate accordingly.

FIG. 3 is a Table showing some examples of duplexer distance versus band gap for band classes 3, 8 and 20 in LTE. From these examples it can be seen that the band gap can be considerably less than the duplexer distance (i.e., the minimum transmit-receive frequency separation as per Table 5.7.4-1 of TS36.101 shown in FIG. 2).

The base station (BS) implementation in terms of its ability to suppress self-interference experienced at its own receiver due to downlink transmissions towards the UE also has limitations. Therefore, the use of a narrower transmit-receive frequency separation may also result in levels of self-interference from the BS transmitter to its own receiver that exceed the ability of the filtering requirements of the BS serving the MTC UE. This may result in degradation in the performance of the BS (e.g., lower throughput) and/or a reduction in the uplink coverage when serving one or more MTC UEs.

According to some embodiments of the present invention, there is provided a method for transmitting and receiving signals in a frequency band in a wireless communications network. This method comprises determining a frequency separation between a frequency of a transmit signal and a frequency of a receive signal within the frequency band based on at least one of a power of the transmit signal, a number of physical channels associated with the transmit signal, and a number of physical channels associated with the receive signal. The method further comprises transmitting and receiving signals in the frequency band in accordance with the determined frequency separation.

Embodiments of the present invention have the advantage that radio resources may be used more efficiently without unacceptably degrading User Equipment/network node performance.

According to an embodiment, the method may be performed by a User Equipment. In this embodiment, the transmit signal may be an uplink signal, from the User Equipment to a network node; and the receive signal may be a downlink signal, from the network node to the User Equipment.

In some embodiments, determining the frequency separation may comprise selecting a transmit-receive frequency separation value from at least two predefined transmit-receive frequency separation values based on at least one of a power of the transmit signal, a number of physical channels associated with the transmit signal, and a number of physical channels associated with the receive signal.

In some embodiments, selecting the transmit-receive frequency separation value may comprise: comparing at least one of a parameter indicative of a power of the transmit signal, a parameter indicative of a number of physical channels associated with the receive signal, and a parameter indicative of a number of physical channels associated with the receive signal with a threshold; and selecting the transmit-receive frequency separation value from the plurality of predefined transmit-receive frequency separation values based on the comparison.

The determined frequency separation may be associated with at least one of a respective maximum transmit power of the User Equipment, a respective maximum number of uplink physical channels, and a respective maximum number of downlink physical channels.

In some embodiments, transmitting and receiving signals in the frequency band in accordance with the determined frequency separation may comprise the User Equipment adapting its transmitter and or receiver based on the determined frequency separation.

The method may further comprise scheduling transmission of uplink data using the determined frequency separation.

According to a further embodiment of the present invention, the method may be performed by a network node. In this embodiment, the transmit signal may be an uplink signal, from a User Equipment to the network node, and the receive signal may be a downlink signal, from the network node to the User Equipment.

The method may further comprise signalling the determined frequency separation to the User Equipment. In some embodiments, the signalling may comprises an identifier identifying the determined frequency separation. For example, the determined frequency separation may be signalled to the User Equipment in Radio Resource Control (RRC) signalling or Layer 1 signalling. According to an embodiment, the determined frequency separation may be signalled to the User Equipment as part of scheduling information.

In some embodiments, transmitting and receiving signals in the frequency band in accordance with the determined frequency separation may comprise the network node adapting its transmitter and or receiver based on the determined frequency separation.

The method may further comprise scheduling transmission of downlink data and or uplink data using the determined frequency separation.

In embodiments, the User Equipment may be capable of full-duplex Frequency Division Duplex (FDD) operation.

In embodiments, the User Equipment may be capable of narrowband operation.

The physical channels may be Physical Resource Blocks (PRBs) or Resource Elements (REs).

The determined frequency separation may be a minimum transmit-receive carrier frequency separation.

According to the present invention, there is also provided a User Equipment comprising a receiver and a transmitter. The User Equipment is operable to determine a frequency separation between a frequency of a transmit signal and a frequency of a receive signal within a frequency band in a wireless communications network based on at least one of a power of the transmit signal, a number of physical channels associated with the transmit signal, and a number of physical channels associated with the receive signal. The User Equipment is further operable to transmit and receive signals in the frequency band in accordance with the determined frequency separation.

According to the present invention, there is also provided a network node comprising a receiver and a transmitter. The network node is operable to determine a frequency separation between a frequency of a transmit signal and a frequency of a receive signal within a frequency band in a wireless communications network based on at least one of a power of the transmit signal, a number of physical channels associated with the transmit signal, and a number of physical channels associated with the receive signal. The network node is further operable to transmit and receive signals in the frequency band in accordance with the determined frequency separation.

Some embodiments of the present invention have the following advantages:
  The use of adaptive transmit-receive frequency separation on the average may enable the use of available radio resources (e.g., UL and DL subframes) more efficiently when the MTC UE transmits in a narrowband mode using the UL and DL time resources;
  The network node may be able to assign more radio resources for scheduling the data to the UE;
  The network node may have less constraint in terms of scheduling data to the UE as on the average fewer time resources are wasted or are unused On the average the UE may have more measurement opportunities due to fewer unused or wasted UL and DL time resource.

BRIEF DESCRIPTION OF THE DRAWINGS

Embodiments of the present invention will now be described, by way of example only, with reference to the Figures:

FIG. 2 shows Table 5.7.4-1 of TS36.101 3GPP E-UTRA User Equipment Radio Transmission and Reception;

DETAILED DESCRIPTION

In the description of some embodiments the non-limiting term UE (user equipment) is used. The UE herein can be any type of wireless device capable of communicating with a network node or another UE over radio signals. The UE may also be a radio communication device, target device, device-to-device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

Also in the description of some embodiments generic terminology, "radio network node" or simply "network node (NW node)", is used. The "radio network node" or "network node" can be any kind of network node which may comprise a base station, radio base station, base transceiver station, base station controller, network controller, evolved Node B (eNB), Node B, relay node, access point, radio access point, Remote Radio Unit (RRU) Remote Radio Head (RRH), etc.

The embodiments are described by considering LTE. However, the embodiments are applicable to any RAT (Radio Access Technology) or multi-RAT systems, where the UE receives and/or transmit signals (e.g., data) e.g., LTE FDD/TDD, WCDMA/HSPA, GSM/GERAN, Wi Fi, WLAN, CDMA2000, etc.

Figure 1:
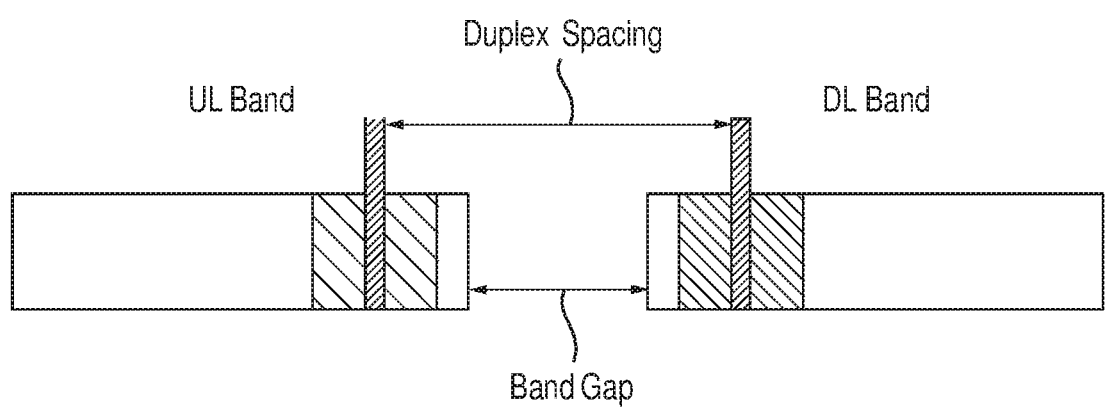
FIG. 1 illustrates a narrowband MTC UE transmit-receive frequency separation.
Figures 3, 4:
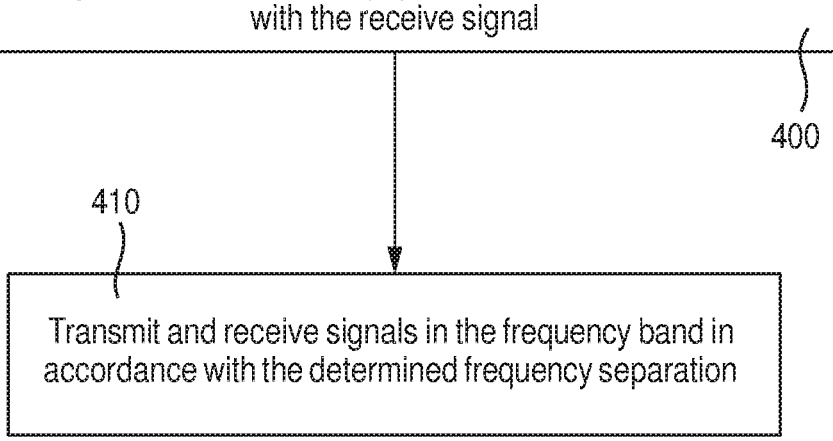
FIG. 3 is a Table showing some examples of duplexer distance versus band gap for band classes 3, 8 and 20 in LTE.
FIG. 4 is a flow chart showing an embodiment of the present invention.

FIG. 4 is a flow chart showing an embodiment of the present invention. At 400 the method comprises determining a frequency separation between a frequency of a transmit signal and a frequency of a receive signal within a frequency band based on at least one of a power of the transmit signal, a number of physical channels associated with the transmit signal, and a number of physical channels associated with the receive signal. At 410 the method comprises transmitting and receiving signals in the frequency band in accordance with the determined frequency separation.

Figure 5:
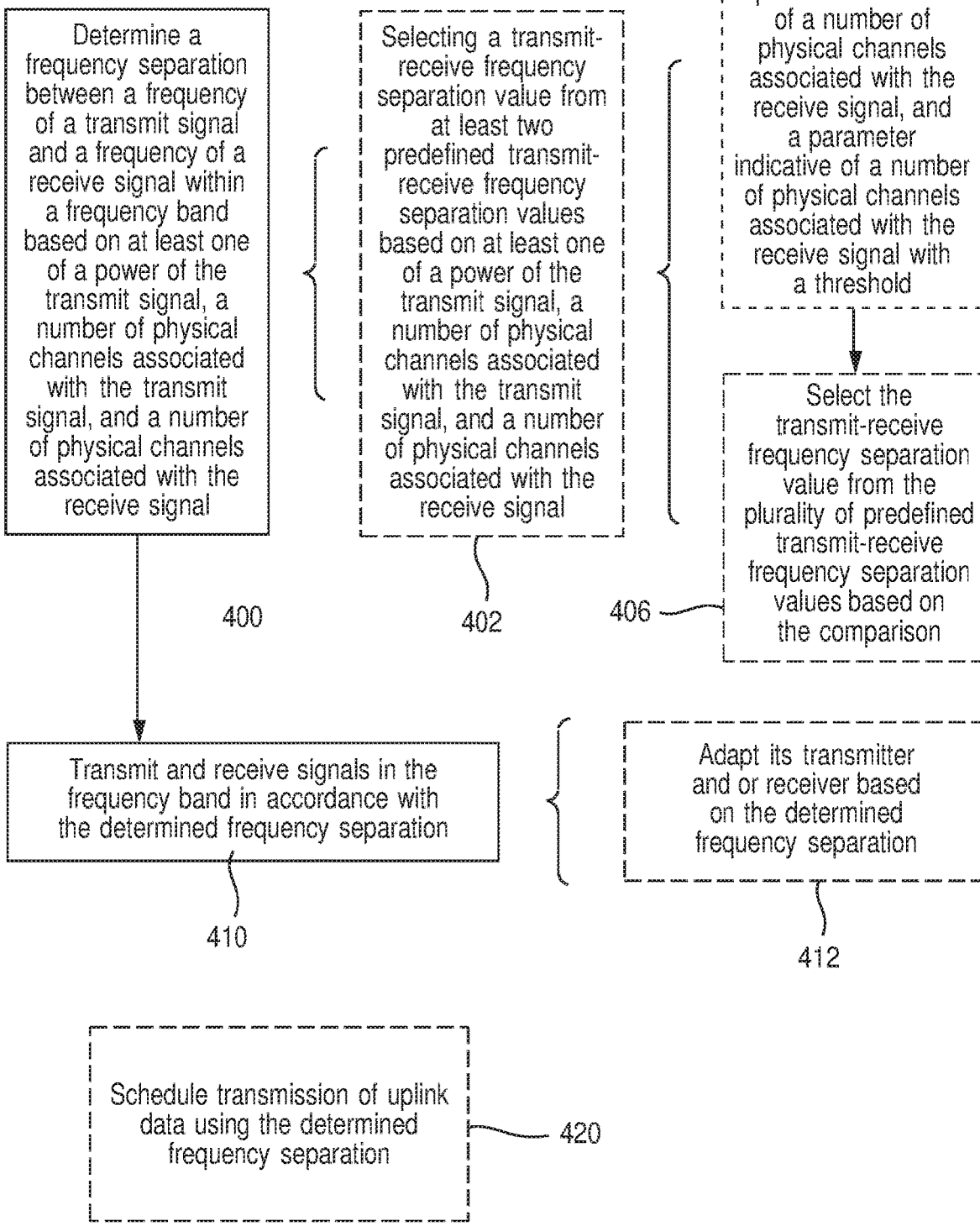
FIG. 5 is a flow chart showing a preferred embodiment of the present invention.

FIG. 5 is a flow chart showing an embodiment of the present invention. In this preferred embodiment, the method described with respect to FIG. 4 is performed by a User Equipment. However, the method described with respect to FIG. 4 may also be performed by a network node, as will be described later with respect to FIG. 6.

The "transmit signal" may be an uplink signal, from the User Equipment to a network node; and the "receive signal" may be a downlink signal, from the network node to the User Equipment.

The step 400 of determining the frequency separation may comprise at 402 selecting a transmit-receive frequency separation value from at least two predefined transmit-receive frequency separation values based on at least one of a power of the transmit signal, a number of physical channels associated with the transmit signal, and a number of physical channels associated with the receive signal.

In some embodiments, step 402, selecting the transmit-receive frequency separation value may comprise at 404 comparing at least one of a parameter indicative of a power of the transmit signal, a parameter indicative of a number of physical channels associated with the receive signal, and a parameter indicative of a number of physical channels associated with the receive signal with a threshold; and at 406 selecting the transmit-receive frequency separation value from the plurality of predefined transmit-receive frequency separation values based on the comparison.

The determined frequency separation may be associated with at least one of a respective maximum transmit power of the User Equipment, a respective maximum number of uplink physical channels, and a respective maximum number of downlink physical channels.

In some embodiments, step 410 transmitting and receiving signals in the frequency band in accordance with the determined frequency separation may comprise at 412 the User Equipment adapting its transmitter and or receiver based on the determined frequency separation.

The method may further comprise at 420 scheduling transmission of uplink data using the determined frequency separation.

Figure 6:
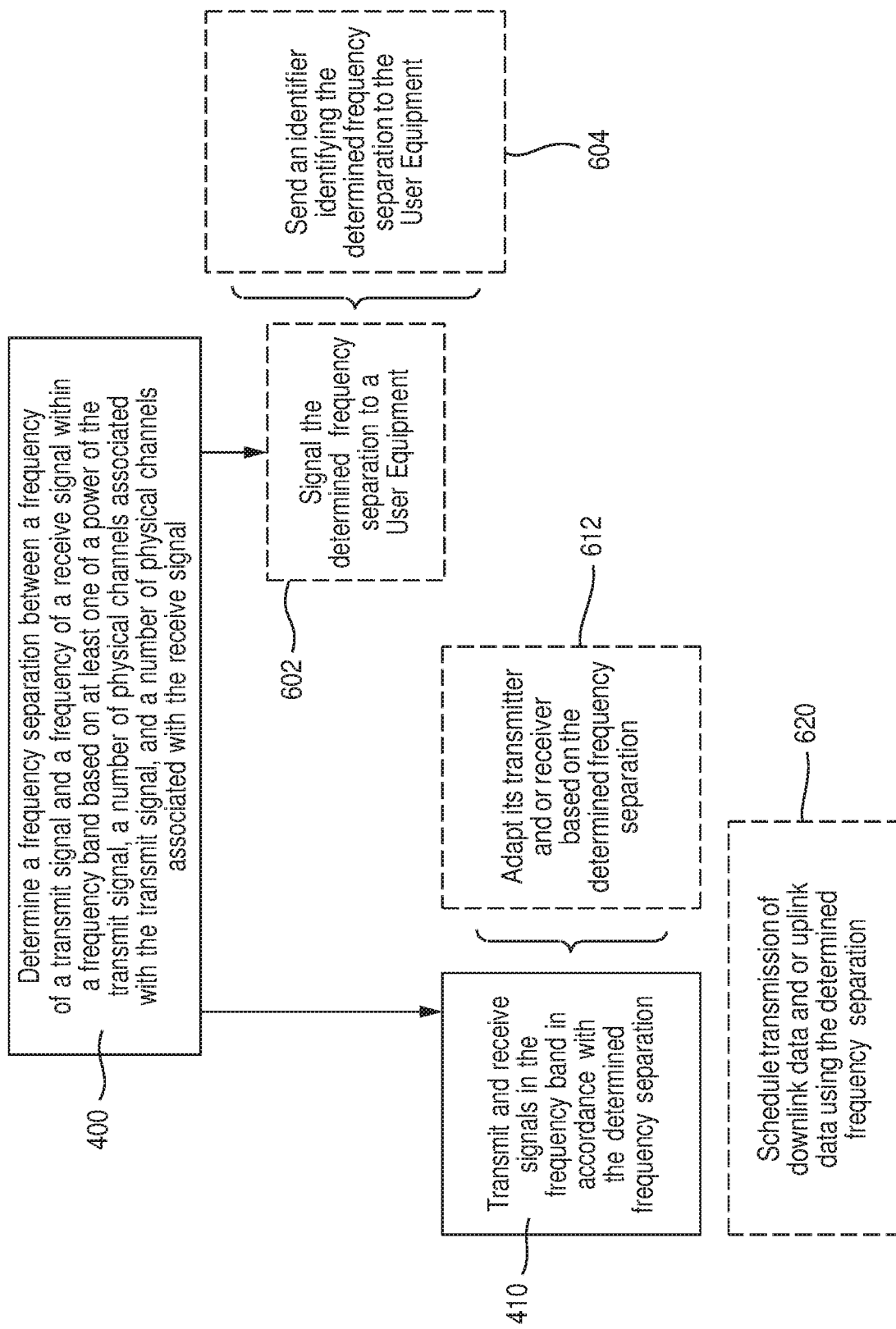
FIG. 6 is a flow chart showing a preferred embodiment of the present invention.

FIG. 6 is a flow chart showing a further preferred embodiment of the invention. In this further preferred embodiment, as mentioned above, the method described with respect to FIG. 4 is performed by a network node.

Similarly, the "transmit signal" may be an uplink signal, from a User Equipment to the network node, and the "receive signal" may be a downlink signal, from the network node to the User Equipment.

Although not shown in FIG. 6, the network node may determine the desired frequency separation using the method described above with respect to FIG. 5, steps 402, 404 and 406.

In some embodiments, the method may further comprise the network node, at 602, signalling the determined frequency separation to the User Equipment. The signalling may comprise an identifier identifying the determined frequency separation. Thus, step 602, may comprise, at 604, sending an identifier identifying the determined frequency separation to the User Equipment.

The determined frequency separation may be signalled to the User Equipment in Radio Resource Control (RRC) signalling or Layer 1 signalling. For example, in some preferred embodiments, the determined frequency separation may be signalled to the User Equipment as part of scheduling information.

In some embodiments, step 410 transmitting and receiving signals in the frequency band in accordance with the determined frequency separation may comprise at 612 the network node adapting its transmitter and or receiver based on the determined frequency separation.

The method may further comprise at 620 scheduling transmission of downlink data and or uplink data using the determined frequency separation.

In some embodiments, the User Equipment may be capable of full-duplex Frequency Division Duplex (FDD) operation. The User Equipment may be capable of narrowband operation.

The determined frequency separation may be a minimum transmit-receive carrier frequency separation. The frequency band may be a predefined frequency band.

In some embodiments, the physical channels may be Physical Resource Blocks (PRBs) or Resource Elements (REs).

Embodiments of the present invention will now be described in more detail below.

Some embodiments comprise a method to dynamically configure the minimum separation between transmit and receive frequencies in MTC UE's. The minimum separation in transmit-receive frequencies can be specified as a network node configurable parameter or be specified as one value from a possible set of pre-defined parameters provided in the relevant standard. Furthermore, the maximum transmit power of the MTC UE may also be configurable in combination with the minimum frequency separation distance.

The minimum transmit-receive frequency separation may be a function of the number of physical channels (e.g., PRB) scheduled to be transmitted in the UL (uplink) by the MTC UE.

Steps which may be performed by a MTC capable UE served by a network node comprise:
  Obtaining an adaptive transmit-receive frequency separation parameter ($\Delta f$) out of at least two values of transmit-receive frequency separation ($\Delta f1$ and $\Delta f2$) by comparing at least one parameter indicative of the band gap of the bandclass being employed by the UE, and possibly a second parameter indicative of the transmit power and a possibly third parameter indicative of the number of physical channels (e.g., PRBs, REs, etc.) being transmitted or expected to be transmitted at a given time index between the UE and the network node (e.g., transmit power, received signal strength, signal measurement such as pathloss) with a threshold (T);
  Using the obtained adaptive transmit-receive frequency separation parameter to identify the allowed physical channels (e.g., PRBs, REs, etc.) and/or transmit power that can be transmitted by the MTC UE in combination with a defined transmit power level.

For example, the UE may further adapt its radio transmitter and/or receiver based on the determined value of the $\Delta f$, and the UE may further communicate with the network node using the determined value of the $\Delta f$ and the values of the associated parameters.

As an additional embodiment, an exception to the minimum transmit-receive frequency separation may be allowed if frequency hopping is employed at a hopping rate above a given threshold.

Steps performed by a network node serving a FD-FDD capable UE may comprise:
  Obtaining at least one parameter (e.g., bandwidth or number of PRBs to be simultaneous transmitted) related to an adaptive transmit-receive frequency separation parameter ($\Delta f$) out of at least two values of transmit-receive frequency separation ($\Delta f1$ and $\Delta f2$), by comparing at least one parameter indicative of the band gap of the bandclass being employed by the UE, and possibly a second parameter indicative of the transmit power and a possibly third parameter indicative of the number of physical channels (e.g., PRBs, REs, etc.) being transmitted or expected to be transmitted at a given time index between the UE and the network node (e.g., transmit power, received signal strength, signal measurement such as pathloss) with a threshold (T); and which parameter is used by the UE for determining the transmit-receive frequency separation ($\Delta f$) between UL and DL time resources.
  Signaling the obtained at least one parameter to the UE for enabling it to configure the time-frequency distance between UL and DL time resources to be transmitted and received as UL and DL radio signals respectively and/or the combination of transmit-receive distance and allowed transmit power to be employed by the UE.
  Adapting (optionally) its radio transmitter and/or receiver based on the determined value of the $\Delta f$, and may further communicate with the UE using the determined value of the $\Delta f$ and the values of the associated parameters used by the UE.

Figure 7:
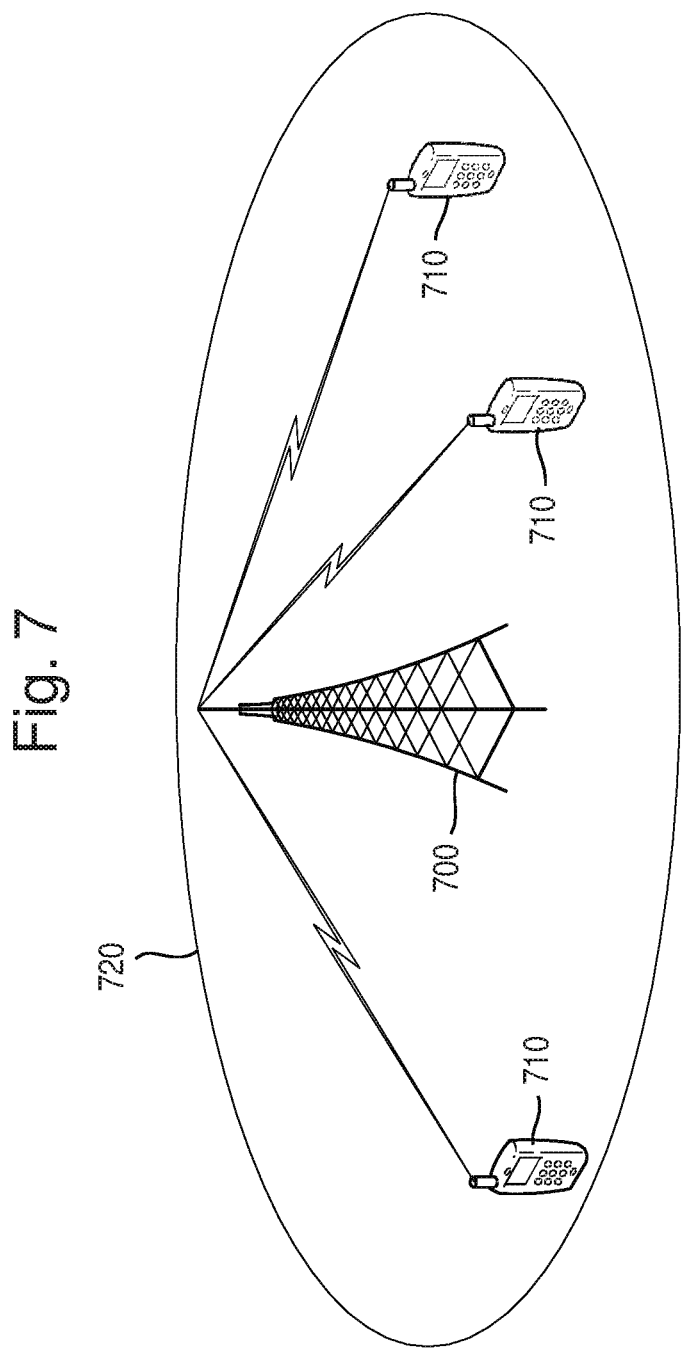
FIG. 7 illustrates an example telecommunications network.

The following describes, by way of example only:
—An embodiment involving adaptively selecting the transmit-receive frequency separation for transmission of UL and DL physical resource blocks (PRBs) in UEs.
—A method in a UE of obtaining and applying adaptive selection of transmit-receive frequency separation for transmission of UL and DL physical resource blocks (PRBs) in UEs.
—A method in a network node of determining the adaptive selection of transmit-receive frequency separation for transmission of UL and DL physical resource blocks.
—A method in a UE comprising signalling capability related to obtaining and applying adaptive selection of transmit-receive frequency separation for transmission of UL and DL physical resource blocks Description of a Scenario Involving Adaptive Transmit-Receive Frequency Separation The scenario comprises at least one UE 710 served by a cell 720 (also referred to as serving cell or PCell of the UE) managed, controlled or served by a network node 700, For example, as shown in FIG. 7. The serving cell operates on a carrier frequency (f1). If the UE is capable of multi-carrier (also referred to as carrier aggregation) the UE may also be served by a plurality of serving cells e.g., primary cell (PCell) and one or more secondary cells (SCells). In some embodiments a dual connectivity capable UE may be configured with a PCell and at least a PSCeII (primary SCell) and may also be configured with one or more SCells. The PCell, PSCeII and SCell(s) may be managed, controlled or served by the same network node or by different network nodes. The following embodiments though described for one serving cell are applicable to a UE served by any number serving cells. In case of multiple serving cells, the UE and/or network node serving the UE may apply the procedures disclosed herein independently for each cell.

In embodiments, the UE operates in full duplex FDD where UL and DL transmission occur in the time resources e.g., in the same subframes. The UL and DL time resource may operate on the same or different carrier frequencies.

The terms transmit-receive frequency separation, TX-RX or RX-TX carrier center frequency separation, TX-RX or RX-TX frequency separation, UL-DL or DL-UL frequency separation, duplexer gap, duplex gap, band separation, duplex spacing, band gap, etc., may be interchangeably used but they all refer to the same concept and meaning i.e., the separation in frequency between the simultaneous transmission and reception of physical channels. Non-limiting examples of physical channels are time-frequency resource, radio channels, resource elements (REs), physical resource blocks (PRBs), resource blocks (RBs), virtual resource blocks (VRBs).

Embodiments may apply to any UE which is capable of FD-FDD operation or UE which is FD-FDD capable. Embodiments may also apply to only certain frequency bands supported by the FD-FDD capable UE or for all bands supported by the FD-FDD capable UE. Examples of certain frequency FD-FDD bands for which embodiments may apply (e.g., by means of pre-defined rule) are bands with specific frequency and/or radio characteristics. Examples of such bands are: bands whose frequencies are above a threshold (e.g., above 2 GHz), bands whose duplex gap is below a threshold (e.g., below 60 MHz), bands whose passband is larger than a threshold (e.g., 50 MHz or above), etc.

Method in a UE of Obtaining and Applying Adaptive Time-Frequency Separation for UL-DL Time Resource In this embodiment, the steps performed by a MTC capable UE served by a network node comprise:

Obtaining an adaptive transmit-receive frequency separation parameter ($\Delta f$) out of at least two values of transmit-receive frequency separation ($\Delta f1$ and $\Delta f2$) by comparing at least one parameter indicative of transmit power and possibly a second parameter indicative of the number of physical channels (e.g., PRBs) being transmitted or expected to be transmitted at a given time index between the UE and the network node (e.g., transmit power, received signal strength, signal measurement such as pathloss) with a threshold (T);

Using the obtained adaptive transmit-receive frequency separation parameter to identify the allowed PRBs that can be transmitted by the MTC UE at a defined power level.

The UE may implicitly or explicitly obtain information related to the transmit-receive frequency separation ($\Delta f$) between UL and DL time resources (also referred to as UL-DL frequency separation), and use the obtained information to determine the frequency location of allowed PRBs to be transmitted meeting the allowed transmit-receive frequency separation requirement.

The UE may perform the following:

Obtaining information related to the default transmit-receive frequency separation for the given bandclass or carrier being employed as well as the default maximum transmit power;

Determining the minimum transmit-receive frequency separation and/or maximum transmit power based on the obtained information; and Employing the minimum transmit-receive frequency separation and/or maximum transmit power during the scheduling and transmission of UL data by the UE.

The above steps which may be performed by the UE in any order are described below.

Obtaining information related to transmit-receive frequency separation—In this step, the UE obtains implicit or explicit information that can be used for determining the allowed transmit-receive frequency separation ($\Delta f$) and/or maximum transmit power to be assumed or used by the UE. The UE may use one or plurality of obtained information for determining the transmit-receive frequency separation ($\Delta f$).

The determined value of $\Delta f$ based on the obtained information may further be associated with the maximum number of UL and/or DL physical channels (e.g., UL/DL RBs) and/or maximum transmit power which can be used by the UE for UL transmission.

The implicit and/or explicit information to be obtained and used by the UE for determining the transmit-receive frequency separation ($\Delta f$) may be one or more of the following: pre-defined, selected by the UE autonomously or explicitly indicated by the network node to the UE as further explained below.

Examples of implicit information are:

Band class (also referred to as frequency band) the UE is employing;

Default transmit-receive frequency separation of bandclass employed by the UE;

Band gap of bandclass employed by the UE. For example, the UE may select and use shorter or the shortest magnitude of $\Delta f$ provided the duplex gap is above a threshold, otherwise it may use the longer or the longest magnitude of $\Delta f$;

Roll-off of filtering or emission mask in use;

Required transmission rate (e.g., target or expected bit rate) for the UL and DL of the MTC device. For example, the UE may select and use shorter or the shortest magnitude of $\Delta f$ provided the transmission rate is below a threshold;

Modulation order or type being employed or to be used by the UL and DL transmissions of the UE. Examples of modulation order are QPSK, 16 QAM, 64 QAM, 256 QAM, etc. For example, the UE may select and use shorter or the shortest magnitude of $\Delta f$ provided modulation order is below a threshold (e.g., 16 QAM), otherwise it may use the longer or the longest magnitude of $\Delta f$;

Channel quality or signal quality between MTC UE and serving network node e.g., RSRQ, SINR, SNR, BLER, etc., measurements obtained from the UE or based on UE feedback signals such as ACK/NACK at the MTC UE. For example, the UE may select and use shorter or the shortest magnitude of $\Delta f$ provided signal quality is above a threshold (e.g., RSRQ is above −10 dB), otherwise it may use the longer or the longest magnitude of $\Delta f$;

Current physical distance between the UE and the serving network node. For example, the UE may select and use shorter or the shortest magnitude of $\Delta f$ provided the physical distance is above a threshold (e.g., 500 meters), otherwise it may use the longer or the longest magnitude of $\Delta f$;

UE speed or velocity e.g., UE speed expressed in Doppler (such as 30 Hz), rate of change of distance (such as 50 km/hr). For example, the UE may select and use shorter or the shortest magnitude of $\Delta f$ provided the speed is below a threshold (e.g., Doppler frequency is below 10 Hz), otherwise it may use the longer or the longest magnitude of $\Delta f$;

Cell size of the serving cell or maximum distance between base station and cell edge e.g., cell range, cell radius;

Power class of the serving base station e.g., maximum power of the BS such as 46 dBm, 30 dBm, 24 dBm, 20 dBm, etc.;

Type of serving base station e.g., wide area BS, medium range BS, local area base station, home base station, etc.;

Type of cell topology or cell deployment type e.g., macro cell, micro cell, pico cell, femto cell, etc.;

Configured maximum UE transmit power e.g., power below 0 dBm means a smaller cell and Therefore, use of a smaller transmit-receive frequency separation (Δf) may be permitted;

UE transmit emission mask;

UE receive filter characteristics;

UE Rx-Tx frequency difference measurement performed by the UE;

eNode B Rx-Tx frequency difference measurement performed by the network node;

Signal strength between UE and the network node e.g., path loss, RSRP, etc., measurements obtained from the UE. For example, the UE may select and use shorter or the shortest magnitude of Δf provided the path loss is above a threshold (e.g., path loss is above 70 dB), otherwise it may use the longer or the longest magnitude of Δf;

Known position or geographical location of UE and network node. Their positions can be determined by using one or more positioning method. Examples are GNSS/A-GNSS (e.g., GPS or A-GPS), OTDOA based RSTD measurements, E-CID, radio fingerprinting or any other known cellular positioning technology, from which relative round trip delay between the UE and the network node can be calculated;

Frequency hopping is employed. For example, the UE may select and use shorter or the shortest magnitude of Δf provided frequency hopping is employed for which the hopping rate is above a given threshold, otherwise it may use the longer or the longest magnitude of Δf;

Examples of explicit information are:

Indication or permission from the network node to use certain value of the transmit-receive frequency separation (Δf) out of two or more pre-defined values when one or more criteria are met.

transmit power of the UE. The transmit power can be any one or more of: averaged transmit power, peak transmit power in one or more slots or subframes or frames, power headroom (i.e., difference between configured maximum transmit power and power to be transmitted in dB), expected transmit power or current or instantaneous transmit power, etc.;

index or location of physical channels (e.g., location of PRBs in frequency domain) to be employed for transmission and/or reception of signals by the UE;

Number of physical channels (e.g., number of PRBs) to be employed for transmission and/or reception of signals by the UE.

The above obtained implicit or explicit information may be valid for each scheduled instance of UL and DL time resources or it may be applicable over a certain validity time (ΔT1) (e.g., (ΔT1=500 ms). The parameter ΔT1 may be applicable from a reference time (T1), where T1 can be the time instant at which the UE obtains the parameter (Δf).

Any of the above information (e.g., implicit or explicit information or their validity time) may be obtained by the UE by one or more of the following means:

Autonomously by the UE e.g., based on radio measurements, by retrieving it from the memory;

Receiving from the network node e.g., via higher layer signaling such as serving network node signaling the switching time to be used;

Receiving from another UE if UE is capable of performing device to device (D2D) operation and in case the other D2D UE has any of this information (e.g., it acquired from the network node);

Pre-defined information e.g., two or more pre-defined transmit-receive frequency separation values such as (Δf)=20 MHz or (Δf)=30 MHz can be used depending on one or more criteria.

Determining transmit-receive frequency separation based on obtained information—In this step, the UE determines the actual transmit-receive frequency separation to be used by the UE for scheduled UL and DL physical channels e.g., UL/DL PRBs.

If the UE obtains a value of the transmit-receive frequency separation explicitly from the network node then it may apply the obtained value for subsequent scheduled UL and DL physical channels e.g., UL/DL PRBs.

If the UE obtains any one or more implicit information for determining the transmit-receive frequency separation then the UE uses the obtained information (e.g., one or more pre-defined sets of information, UE selected or indicated by the network node) for determining the actual value of the transmit-receive frequency separation.

The determination at the UE is typically done by comparing one or more obtained information or parameters with one or more thresholds (H) and based on the comparison of the parameter with the thresholds, selects one of the two or more predefined values of the transmit-receive frequency separation. The threshold(s) may be pre-defined or received from the network node e.g., via higher layer signaling such as via RRC or MAC.

The determination of the transmit-receive frequency separation (Δf) can also be based on a function.

An example of a general function is:

$$(\Delta f) = f(\Delta f_1, \Delta f_2, \ldots, \Delta f_i, P1, P2, \ldots, Pj, H1, H2, \ldots, H_j)$$

where $\Delta f_i$ is one of the pre-defined transmit-receive frequency separation values, the parameter Pi is one of the parameters (e.g., maximum power, maximum UL physical channels that UE can transmit, max DL physical channels that UE can receive, etc.) and Hi is the threshold to compare the parameter Pi.

The above generalized function or mechanism in the UE to derive the transmit-receive frequency separation to be used is described by various examples below.

The relation or mapping between the comparison of the one or more obtained parameters with their respective obtained threshold(s) and the corresponding transmit-receive frequency separation to be selected based on comparison by the UE can be pre-defined. This is also explained with several examples below:

In one embodiment the UE may obtain one or more parameters that implicitly or explicitly indicate the minimum transmit-receive frequency separation, maximum transmit power and also the maximum number of UL and/or DL physical channels (e.g., UL or DL RBs) that the UE may use in combination with the minimum transmit-receive frequency separation. An example is illustrated in table 1 below for combinations of each of the minimum transmit-receive frequency separation as well as the maximum UL RBs that can be transmitted by the UE. In this example P1 is a parameter indicative of the maximum power and P2 is a parameter indicative of the maximum UL RBs. The UE then compares the value of the obtained parameters P1 and P2 with a least one threshold (H) and (B) respectively. Based on the valid combination of P1 and P2, the minimum transmit-receive frequency separation is determined.

TABLE 1

Determination of one of the 'm' pre-defined minimum transmit-receive frequency separation values by the UE

| | | | | Determination of minimum transmit-receive frequency separation and maximum transmit power of the UE |
|---|---|---|---|---|
| Frequency Separation ID | Transmit Power ID | Result of comparing parameter (P1) with threshold (H) | Result of comparing parameter (P2) with threshold (B) | Determined minimum transmit-receive frequency separation ($\Delta f$) |
| 0 | 0 | P1 < H | P2 < B | K frequency resources (MHz) |
| 1 | 0 | P1 < H | P2 ≥ B | L frequency resources (MHz) |
| 2 | 1 | P1 ≥ H | P2 < B | M frequency resources (MHz) |
| 3 | 1 | P1 ≥ H | P2 ≥ B | N frequency resources (MHz) |

In another example, the UE may obtain one or more parameters that implicitly or explicitly indicate the minimum transmit-receive frequency separation and use them for determining one of the three possible values of transmit-receive frequency separation. This example is illustrated in Table 2 below. This is similar to the example in table 1 except that in this case the UE may use up to two threshold values (H1 and H2) for comparing it with the obtained parameter (P) that is implicitly or explicitly indicative of the said transmit-receive frequency separation ($\Delta f$). An example is illustrated in table 2 for combinations of each of the minimum transmit-receive frequency separation as well as the maximum UL RBs that can be transmitted by the UE. In this example, P1 is a parameter indicative of the maximum power and P3 is a parameter indicative of the maximum UL RBs. The UE then compares the value of the obtained parameters P1 with at least two thresholds (H1 and H2) and the parameter P3 with at least one threshold (B1) respectively. Based on the valid combination of P1 and P3, the minimum transmit-receive frequency separation is determined as shown in table 2.

TABLE 2

Determination of one of the three pre-defined minimum transmit-receive frequency separation values with two pre-defined transmit power input values by the UE

| | | | | Determination of minimum transmit-receive frequency separation and maximum transmit power of the UE |
|---|---|---|---|---|
| Frequency Separation ID | Transmit Power ID | Result of comparing parameter (P1) with thresholds (H1, H2) | Result of comparing parameter (P3) with threshold (B1) | Determined minimum transmit-receive frequency separation ($\Delta f$) |
| 0 | 0 | P1 < H1 | P3 < B1 | K frequency resources (MHz) |
| 1 | 0 | P1 < H1 | P3 ≥ B1 | L frequency resources (MHz) |
| 2 | 0 | H1 < P1 < H2 | P3 < B1 | M frequency resources (MHz) |
| 3 | 1 | H1 < P1 < H2 | P3 ≥ B1 | N frequency resources (MHz) |
| 4 | 1 | P1 ≥ H2 | P2 < B1 | Q frequency resources (MHz) |
| 5 | 1 | P1 ≥ H2 | P3 ≥ B1 | R frequency resources (MHz) |

In yet another embodiment the UE may obtain one or more parameters that implicitly or explicitly indicate the minimum transmit-receive frequency separation as well as the maximum transmit power that the UE may use in combination with the minimum transmit-receive frequency separation. Similar to the examples above the parameters obtained by the UE may be employed to determine one of 2, 3 or in general n combinations of minimum transmit—receive frequency separation and maximum transmit power. An example is illustrated in table 3 below for 2 combinations of each of the minimum transmit-receive frequency separation as well as the maximum transmit power. In this example P4 is a parameter indicative of the minimum transmit-receive frequency separation and P5 is a parameter indicative of the maximum rated transmit power of the UE (i.e., 23 dBm or 31 dBm). The UE then compares the value of the obtained parameters P4 and P5 with a least one threshold (H3) and (B2) respectively. Based on the valid combination of P4 and P5, the minimum transmit-receive frequency separation and maximum allowed transmit power combination is chosen from the values K or L and Y or Z respectively. Note that the maximum allowed power can be a value less than the maximum rated power of the UE.

TABLE 3

Determination of one of the 2 pre-defined minimum transmit-receive frequency separation values combined with 2 allowed maximum transmit power levels for the UE

| | | | | Determination of minimum transmit-receive frequency separation and maximum transmit power of the UE |
|---|---|---|---|---|
| Frequency Separation ID | Transmit Power ID | Result of comparing parameter (P4) with threshold (H3) | Result of comparing parameter (P5) with threshold (B2) | Determined minimum transmit-receive frequency separation ($\Delta f$) |
| 0 | 0 | P4 < H3 | P5 < B2 | K frequency resources (MHz), Y dBm transmit power |
| 1 | 0 | P4 < H3 | P5 ≥ B2 | K frequency resources (MHz), Z dBm transmit power |
| 2 | 1 | P4 ≥ H3 | P5 < B2 | L frequency resources (MHz), Y dBm transmit power |
| 3 | 1 | P4 ≥ H3 | P5 ≥ B2 | L frequency resources (MHz), Z dBm transmit power |

The above examples can be generalized similar to the previous examples in tables 1, 2, 3 (and tables 4 and 5 below), except that in the general case the UE may use up to (n-1) threshold values (H1, H2, ..., Hn-1) for the parameter indicative of the minimum transmit-receive frequency separation and (n-1) threshold values (J1, J2, ..., Jn-1) for the parameter indicative of the maximum transmit power for comparison with the obtained parameters (P1 and P2) that are implicitly or explicitly indicative of the said minimum transmit-receive frequency separation as well as the maximum transmit power respectively. Based on this comparison the UE determines one of the n values for the minimum transmit-receive frequency and one of the n values for the maximum transmit power.

In yet another example, as illustrated in table 4 below, the transmit-receive frequency separation is selected based on UE transmit power e.g., current power, expected power, power headroom, maximum power to be used by the UE, etc. In this example P6 is a parameter indicative of the UE transmit power of the UE (i.e., 10 dBm) or power headroom e.g., 20 dB. The UE then compares the value of the obtained parameter P6 with a threshold (B3) respectively. Based on the valid comparison of P6, the minimum transmit-receive frequency separation is chosen from the values K and L.

TABLE 4

Determination of one of the 2 pre-defined minimum transmit-receive frequency separation values based on UE transmit power levels for the UE

| Frequency Separation ID | Transmit Power ID | Determination of minimum transmit-receive frequency separation and maximum transmit power of the UE | | |
|---|---|---|---|---|
| | | Result of comparing parameter (P6) with threshold (B3) | Determined minimum transmit-receive frequency separation ($\Delta f$) and maximum transmit power | |
| 0 | 0 | P6 < B3 | K frequency resources (MHz) | |
| 1 | 1 | P6 ≥ B3 | L frequency resources (MHz) | |

In yet another example, as illustrated in table 5 below, the transmit-receive frequency separation is selected based on UL and/or DL physical channels for use by the UE e.g., current RBs used, expected RBs to be used, maximum RBs to be used by the UE, etc. In this example P7 is a parameter indicative of the RBs for use by the UE (i.e., 5 RBs) or the fraction of RBs with respect to total RBs in the cell bandwidth. The UE then compares the value of the obtained parameter P7 with a threshold (B4) respectively. Based on the valid comparison of P7, the minimum transmit-receive frequency separation is chosen from the values K and L.

TABLE 5

Determination of one of the 2 pre-defined minimum transmit-receive frequency separation values based on number of UL and/or DL physical channels for the UE

| Frequency Separation ID | Transmit Power ID | Determination of minimum transmit-receive frequency separation and maximum transmit power of the UE | |
|---|---|---|---|
| | | Result of comparing parameter (P7) with threshold (B4) | Determined minimum transmit-receive frequency separation ($\Delta f$) and maximum transmit power |
| 0 | 0 | P7 < B4 | K frequency resources (MHz) |
| 1 | 1 | P7 ≥ B4 | L frequency resources (MHz) |

In yet another example, as illustrated in Table 6 below, the transmit-receive frequency separation is selected based on whether frequency hopping is employed at a rate above a given threshold. In this example P8 is a parameter indicative of the rate of frequency hopping (e.g., hopping at least once every subframe) The UE then compares the value of the obtained parameter P8 with a threshold (B5) respectively. Based on the valid comparison of P8, the minimum transmit-receive frequency separation is chosen from the values K and L.

TABLE 6

Determination of one of the 2 pre-defined minimum transmit-receive frequency separation values based on use of frequency hopping by the UE

| Frequency Separation ID | Transmit Power ID | Determination of minimum transmit-receive frequency separation and maximum transmit power of the UE | |
|---|---|---|---|
| | | Result of comparing parameter (P8) with threshold (B5) | Determined minimum transmit-receive frequency separation ($\Delta f$) and maximum transmit power |
| 0 | 0 | P8 < B5 | K frequency resources (MHz) |
| 1 | 1 | P8 ≥ B5 | L frequency resources (MHz) |

In some embodiments, in case the UE is not able to obtain the needed information related to the minimum transmit-receive frequency separation or maximum transmit power, e.g., during an initialization phase, the UE adopts a pre-defined default value instead until it is able to obtain the needed information. It may also be chosen that the UE will assume a pre-defined value for minimum transmit-receive frequency separation or maximum transmit power, in case it does not obtain the above values or associated information to determine the minimum transmit-receive frequency separation or maximum transmit power.

In some embodiments, the UE applies a hysteresis in the comparison between a parameter value and a threshold in order to avoid unnecessarily frequent changes between parameter settings, e.g., due to statistical fluctuations in measurement values.

Employing the Minimum Transmit-Receive Frequency Separation and Transmit Power

Upon acquiring the minimum transmit-receive frequency separation and/or maximum transmit power as described in the previous section, the UE employs these parameters when selecting PRBs to be transmitted.

Note that scheduling of PRBs may be determined by eNB, however the UE may autonomously schedule the PRBs as well.

The term acquiring herein may comprise any of receiving, acquiring, determining, selecting, retrieving or obtaining the minimum transmit-receive frequency separation and/or maximum transmit power or associated information (such as scheduling) i.e., by any one or more of: autonomously, based on a pre-defined rule for receiving from another node (e.g., UE or network node). The UE may also retrieve from its memory the minimum transmit-receive frequency separation and/or maximum transmit power acquired previously or at any earlier time. In this case the UE may also determine if the retrieved minimum transmit-receive frequency separation and/or maximum transmit power is applicable for use with the current UL and DL time resources. For example, the UE may determine if the validity time for using the retrieved or acquired minimum transmit-receive frequency separation and/or maximum transmit power is still valid e.g., validity timer (e.g., 500 ms) has not yet expired. The value of the timer may also be adapted based on UE speed e.g., shorter value of the timer at higher UE speed (such as above 50 km/hr).

The UE also acquires the information related to the next scheduling instance between UL and DL time resources to be performed and/or the pattern of such scheduling applicable over certain time period (e.g., frame or multiple frames or periodic pattern, etc.). The UE may acquire this information based on any one or more of:

scheduling data on UL and/or DL time resources by the network node;

semi-static or semi-persistent scheduling pattern for physical signals or channels configured by the network node;

any kind of periodic or aperiodic pattern of scheduling of data on UL and DL time resources by the network node.

If the acquired minimum transmit-receive frequency separation and/or maximum transmit power values are valid then the UE uses the acquired information related to these values at the next scheduling occurrence. The UE may also store the statistics related to the minimum transmit-receive frequency separation or maximum transmit power used for performing the scheduling and use it in future time e.g., for reporting the statistics to the network node.

Method in a Network Node of Determining and Configuring a UE with Adaptive Minimum Transmit-Receive Frequency Separation and Maximum Transmit Power The steps which may be performed by a network node serving a FD-FDD capable UE comprise:

Obtaining at least one parameter (e.g., bandwidth or number of PRBs to be simultaneously transmitted) related to an adaptive transmit-receive frequency separation parameter ($\Delta f$), which can be a function of the at least two values of transmit-receive frequency separation ($\Delta f1$ and $\Delta f2$), and which parameter is used by the UE for determining the transmit-receive frequency separation ($\Delta f$) between UL and DL time resources. Furthermore, obtaining at least one combination of transmit-receive frequency separation and allowed transmit power to be employed by the UE for a given transmit-receive frequency separation.

Signaling the obtained at least one parameter to the UE for enabling it to configure the time-frequency distance between UL and DL time resources to be transmitted and received as UL and DL radio signals respectively and/or the combination of transmit-receive distance and allowed transmit power to be employed by the UE.

In this context, the network node implicitly or explicitly obtains information related to the minimum transmit-receive frequency separation parameter ($\Delta f$) and/or maximum transmit power to be used by the UE for scheduling and transmitting UL PRBs. The determined value of $\Delta f$ based on the obtained information may further be associated with the maximum number of UL and/or DL physical channels (e.g., UL/DL RBs) and/or maximum transmit power which can be used by the UE for UL transmission. The association may also be pre-defined. Therefore, the UE can also determine the maximum number of UL and/or DL physical channels (e.g., UL/DL RBs) and/or maximum transmit power based on the value of $\Delta f$ received from the network node and the pre-defined association.

The network node may also configure its own UL signal reception from the UE and DL signal transmission towards the UE based on the determined value of $\Delta f$ for the UE. This will allow the network node to perform radio communication with the UE which is configured to operate using the determined value of $\Delta f$.

The network node may also configure the UE with information which allows the UE to determine when to employ the indicated minimum transmit-receive frequency separation parameter ($\Delta f$) and/or maximum transmit power for scheduling of UL PRBs.

Steps which may be performed by the network node comprise:

Obtaining information related to the minimum transmit-receive frequency separation parameter ($\Delta f$) and or the maximum transmit power.

Signaling this information to assist the UE in determining the permitted PRBs to transmit data on and the maximum transmit power that can be employed.

An additional or optional step performed by the network node comprises:

Configuring the UE with UL and/or DL time resources and the permitted maximum transmit power.

The above steps, which may be performed in any order, are described below.

Obtaining information related to frequency separation—In this step, the network node determines the minimum transmit-receive frequency separation parameter ($\Delta f$) and/or the maximum transmit power to be used by the UE.

The network uses one or more of the following information to determine which minimum transmit-receive frequency separation and/or the maximum transmit power should be used by the UE or any implicit information to be used by the UE for determining these values. Examples of such information to be used the network node are the same as described above.

Depending upon the type of the information, the network node obtains the above information based on any one or more of the following:

Measurement performed by the network node itself on at least the signals transmitted by the UE;

Pre-defined information;

Measurement performed by the UE.

The network node based on the above information may determine the minimum transmit-receive frequency separation and/or the maximum transmit power to be used by the UE. The network node may also determine the threshold value to be used by the UE for determining the minimum transmit-receive frequency separation and/or the maximum transmit power based on a comparison between one or more parameters (P) which is indicative of the frequency separation and transmit power of the UE and the respective thresholds (H).

The network node may use a similar comparison between one or more parameters (Pi) and thresholds (Hi, Bi) as used by the UE for determining the frequency separation and maximum transmit power. Therefore, examples in tables 1, 2, 3, 4, 5 and 6 are also applicable for use by the network node.

Signaling information to assist the UE based on obtained information—Upon determining the frequency separation and/or transmit power to be used by the UE, the network node may signal one or more pieces of information to the UE that assists the UE to use or itself determine the frequency separation and transmit power of the UE.

The network node may or may not signal the determined frequency separation and/or transmit power to the UE. If the network node signals the frequency separation and/or transmit power to the UE then it may signal either the absolute value of the frequency separation and/or transmit power or it may signal only the identifier of the determined frequency separation and/or transmit power. In the latter case, both identifiers and the corresponding frequency separation and/or transmit power can be pre-defined; this is shown in examples in tables 1-3.

For example, the network node may also decide to signal only the threshold(s) to be used by the UE for comparing P with H to obtain the frequency separation and/or transmit power.

In case the network node signals the determined frequency separation and/or transmit power, the UE uses it for scheduling and transmitting UL resources. On the other hand, if the network node signals implicit information to the UE such as thresholds and/or type of parameters to be used by the UE for determining the frequency separation and/or transmit power, then the UE uses the received information and the pre-defined relations for determining the frequency separation and/or transmit power.

The network node may also signal information related to the validity time over which the signaled parameters or associated information is valid. This can be realized by configuring a timer at the UE. For example, the UE can be configured that the information related to the frequency separation and/or transmit power is valid for use by the UE up to 500 milliseconds from the moment the information is received at the UE. In another example it may be pre-defined or configured by the network node at the UE that the information related to the frequency separation and/or transmit power is valid for performing up to Z (e.g., Z=1, Z=10, etc.) number of transitions between UL-DL time resources.

Any one or more of the above information can be provided to the UE using higher layer signaling (e.g., RRC, MAC, etc.) or in lower layer signaling (e.g., L1 channels such as PDCCH, etc.). The information may also be signaled as part of the scheduling information.

The network node (also referred to as transmitting network node) may also signal one or more set of the above information related to one or plurality of the UEs to another network node (also referred to as receiving network node), e.g., a neighboring eNode B over X2 interface. The receiving network node may use the received information for determining one or more parameters related to the frequency separation and/or transmit power to be used for its own UEs and/or the received information be used for the UEs after their cell change from the transmitting network node.

In some embodiments, in case the network is not able to signal the information to assist the UE, e.g., during an initialization phase, the network assumes that the UE is applying a predefined default value instead until it is able to obtain the assistance information from the network. It may also be pre-defined that the UE will assume a pre-defined value for frequency separation and/or transmit power in case it does not obtain the frequency separation and/or transmit power or associated information to drive or obtain the frequency separation and/or transmit power. In another example the pre-defined default value can be the smallest of the pre-defined values. The network will in such a situation determine the frequency separation and/or transmit power based on the pre-defined rule and adapts its scheduling as will be described later.

In some embodiments, the network applies a hysteresis in the comparison between a parameter value and a threshold in order to avoid unnecessarily frequent changes between different frequency separation and/or transmit power values e.g., due to statistical fluctuations in measurement values.

Configuring UE with UL and DL time resources—The network node schedules the data for UL transmission and DL transmission on UL time resource and DL time resource respectively. The scheduling can be done on a subframe basis, e.g., sending a scheduling grant on the PDCCH. The network node may also pre-configure the UE with a pattern of UL and DL time resources for UL and DL transmissions respectively. The scheduling information acquired by the UE is used by the UE for transmission on the UL and reception on the DL.

According to another embodiment, the network node also adapts it's scheduling to account for the currently used frequency separation and/or transmit power.

Method in a UE Signaling Capability Related to Obtaining and Applying Adaptive Frequency Separation and/or Transmit Power According to this embodiment, a UE signals a capability information to another node (a network node such as base station, eNode B, relay, core network (MME), another UE capable of D2D operation, etc.) to inform whether the UE is capable of acquiring and using or applying information related to the minimum transmit-receive frequency separation and/or transmit power. More specifically, the UE capability information may indicate whether the UE is capable of obtaining and using adaptive frequency separation and/or transmit power, wherein the adaptation is done by selecting between at least two values of switching times. More generally the UE may indicate whether it has the capability to obtain one or more parameters related to the frequency separation and/or transmit power, use them to determine the frequency separation and/or transmit power and use the determined frequency separation and/or transmit power for scheduling and transmitting data. i.e., whether UE is capable of any of the procedures described above. The capability information is sent via higher layer signaling (e.g., RRC signaling) to the network node. The information may be sent during initial call setup or after cell change (e.g., handover, etc.) or during the session or call.

The UE capability information may also contain additional or more specific information such as:
    UE is capable of autonomously determining the adaptive frequency separation and/or transmit power e.g., based on pre-defined parameters and/or rules, and using the determined frequency separation and/or transmit power for switching;

UE is capable of determining the adaptive frequency separation and/or transmit power based on information received from the network node e.g., threshold for comparing with the determined parameter to find the frequency separation and/or transmit power, and using the determined frequency separation and/or transmit power values;

UE is capable of determining the adaptive frequency separation and/or transmit power based on any combination of: information received from the network node and/or another UE, pre-defined parameters and/or rules, and autonomous determination by the UE, and using the determined frequency separation and/or transmit power values;

the frequency bands for which the UE is capable of performing any one or more of the above.

The acquired UE capability information may be used by the network node (e.g., eNode B, base station, etc.) for performing one or more radio operation tasks or network management tasks:

The tasks comprise forwarding the received UE capability information to another network node which may use it after cell change of the UE.

The network node may store the received capability information and use it in future e.g., when the same UE performs switching or returns to be served by the network node.

The network node may also decide based on the received information whether to configure or signal any information related to the frequency separation and/or transmit power or any information which may assist the UE in determining or using the frequency separation and/or transmit power. For example, if the UE needs to receive the frequency separation and/or transmit power as it cannot determine it autonomously, then the network node itself determines the frequency separation and/or transmit power and signals the determined value to the UE.

In general, the idea according to some embodiments of the present invention is that a UE or network node determines an adaptive transmit-receive frequency separation parameter ($\Delta f$) out of at least two values of transmit-receive frequency separation ($\Delta f1$ and $\Delta f2$) for a frequency band, based on one or more criteria (e.g., pre-defined rule, transmit power, etc.). The determined value of the $\Delta f$ is associated with at least one of: a maximum number of UL and/or DL RBs, and maximum UE transmit power allowed by the UE when using the determined value of the $\Delta f$. The network node may also signal the determined value of the 66 f to the UE. The UE and the network node may further adapt their respective radio transmitters and/or receivers based on the determined value of the $\Delta f$. The UE and the network node communicate with each using the determined value of the $\Delta f$ and the values of the associated parameters.

Figure 8:
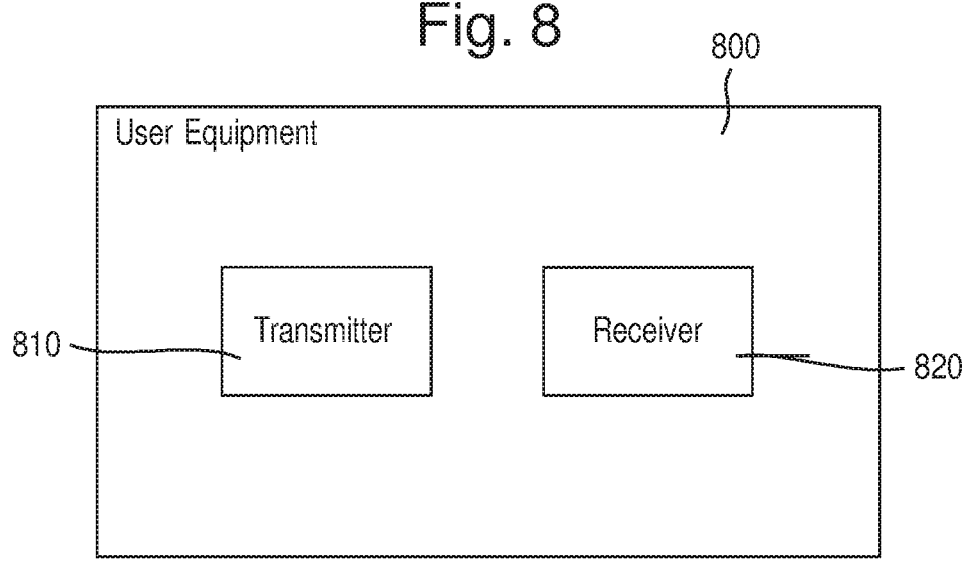
FIG. 8 shows a user equipment according to an embodiment of the present invention.

FIG. 8 shows a User Equipment 800 according to an embodiment of the present invention. The User Equipment 800 comprises a receiver 810 and a transmitter 820. According to embodiments of the present invention, the User Equipment 800 is operable, e.g., using processing circuitry comprising a controller or processor configured with appropriate firmware and/or software, stored in memory associated with the controller or processor, to determine a frequency separation between a frequency of a transmit signal and a frequency of a receive signal within a frequency band in a wireless communications network based on at least one of a power of the transmit signal, a number of physical channels associated with the transmit signal, and a number of physical channels associated with the receive signal. The User Equipment 810 is further operable to transmit and receive signals in the frequency band in accordance with the determined frequency separation. The frequency band may be a predefined frequency band.

The transmit signal may be an "uplink signal", from the User Equipment to a network node; and the receive signal may be a "downlink signal", from the network node to the User Equipment.

In some embodiments, the User Equipment 800 may be operable to determine the frequency separation by selecting a transmit-receive frequency separation value from at least two predefined transmit-receive frequency separation values based on at least one of a power of the transmit signal, a number of physical channels associated with the transmit signal, and a number of physical channels associated with the receive signal. The at least two predefined transmit-receive frequency separation values may be stored in the User Equipment's memory (not shown).

In some embodiments, the User Equipment 800 may be operable to select the transmit-receive frequency separation value by comparing at least one of a parameter indicative of a power of the transmit signal, a parameter indicative of a number of physical channels associated with the receive signal, and a parameter indicative of a number of physical channels associated with the receive signal with a threshold; and selecting the transmit-receive frequency separation value from the plurality of predefined transmit-receive frequency separation values based on the comparison.

The determined frequency separation may be associated with at least one of a respective maximum transmit power of the User Equipment 800, a respective maximum number of uplink physical channels, and a respective maximum number of downlink physical channels.

The User Equipment 800 may further be operable to adapt its transmitter and or receiver based on the determined frequency separation.

The User Equipment 800 may further be operable to schedule transmission of uplink data using the determined frequency separation.

The User Equipment 800 may be capable of full-duplex Frequency Division Duplex (FDD) operation. The User Equipment 800 may be capable of narrowband operation.

The physical channels may be Physical Resource Blocks (PRBs) or Resource Elements (REs).

The determined frequency separation may be a minimum transmit-receive carrier frequency separation.

Figure 9:
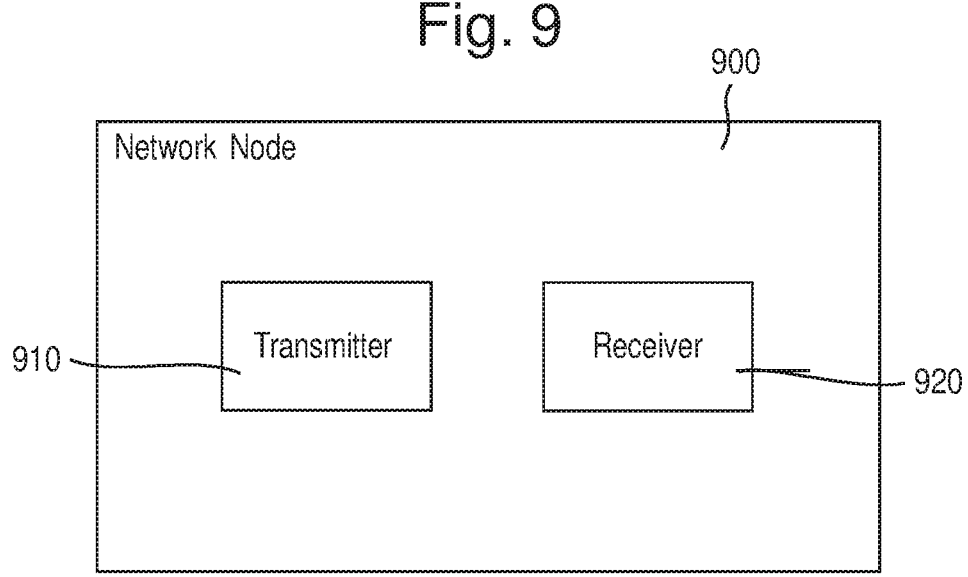
FIG. 9 shows a network node according to an embodiment of the present invention.

FIG. 9 shows a network node 900 according to an embodiment of the present invention. The network node 900 comprises a receiver 910 and a transmitter 920. The network node 900 is operable, e.g., using processing circuitry comprising a controller or processor configured with appropriate firmware and/or software, stored in memory associated with the controller or processor, to determine a frequency separation between a frequency of a transmit signal and a frequency of a receive signal within a frequency band in a wireless communications network based on at least one of a power of the transmit signal, a number of physical channels associated with the transmit signal, and a number of physical channels associated with the receive signal. The network node 900 is further operable to transmit and receive signals in the frequency band in accordance with the determined frequency separation. The frequency band may be a predefined frequency band.

The "transmit signal" may be an "uplink signal", from a User Equipment to the network node, and the "receive signal" may be a downlink signal, from the network node to the User Equipment.

In some embodiments, the network node 900 may further be operable to signal the determined frequency separation to the User Equipment. The signalling may comprise an identifier identifying the determined frequency separation. In preferred embodiments, the network node 900 may be operable to signal the determined frequency separation to the User Equipment in Radio Resource Control (RRC) signalling or Layer 1 signalling. The network node 900 may be operable to signal the determined frequency separation to the User Equipment as part of scheduling information.

The network node 900 may be operable to adapt its transmitter and or receiver based on the determined frequency separation.

The network node 900 may further be operable to schedule transmission of downlink data and or uplink data using the determined frequency separation.

The User Equipment may be capable of full-duplex Frequency Division Duplex (FDD) operation. The User Equipment may be capable of narrowband operation.

The physical channels may be Physical Resource Blocks (PRBs) or Resource Elements (REs).

The determined frequency separation may be a minimum transmit-receive carrier frequency separation.

The skilled person will understand that the User Equipment 800 and or network node 900 may comprise appropriate hardware and or software such that it is operable to perform the above described methods. For example, the User Equipment 800 and network node 900 may each comprise a processor and a memory. The skilled person will also understand that each of the User Equipment 800 and network node 900 may be considered to include a number of "virtual units" each configured to, in use, perform a respective step of the above described methods. For example, each of the User Equipment 800 and network node 900 may be considered to comprise a determining unit configured to determine a frequency separation between a frequency of a transmit signal and a frequency of a receive signal within a frequency band in a wireless communications network based on at least one of a power of the transmit signal, a number of physical channels associated with the transmit signal, and a number of physical channels associated with the receive signal.

Embodiments of the present invention have the advantage that radio resources may be used more efficiently without unacceptably degrading User Equipment and or network node performance.

What is claimed is:

1. A method, performed by a User Equipment, for transmitting and receiving signals in a frequency band in a wireless communications network, the method comprising:
   determining a frequency separation between a frequency of a transmit signal and a frequency of a receive signal within the frequency band by selecting the frequency separation from a plurality of frequency separations that are possible for the band, based on at least one of a power of the transmit signal, a number of physical channels associated with the transmit signal, and a number of physical channels associated with the receive signal; and
   transmitting and receiving signals in the frequency band in accordance with the determined frequency separation;
   wherein each of the plurality of frequency separations corresponds to a predefined transmit-receive frequency separation value, and wherein selecting the frequency separation comprises:
   comparing at least one of a parameter indicative of a power of the transmit signal, a parameter indicative of a number of physical channels associated with the receive signal, and a parameter indicative of a number of physical channels associated with the receive signal with a threshold; and
   selecting a transmit-receive frequency separation value from the plurality of predefined transmit-receive frequency separation values based on the comparison.

2. The method of claim 1, wherein the transmit signal is an uplink signal, from the User Equipment to a network node; and the receive signal is a downlink signal, from the network node to the User Equipment.

3. The method of claim 1, wherein the determined frequency separation is associated with at least one of a respective maximum transmit power of the User Equipment, a respective maximum number of uplink physical channels, and a respective maximum number of downlink physical channels.

4. The method of claim 1, wherein transmitting and receiving signals in the frequency band in accordance with the determined frequency separation comprises the User Equipment adapting its transmitter and or receiver based on the determined frequency separation.

5. The method of claim 1, further comprising scheduling transmission of uplink data using the determined frequency separation.

6. The method of claim 1, wherein the User Equipment is capable of full-duplex Frequency Division Duplex (FDD) operation.

7. The method of claim 1, wherein the User Equipment is capable of narrowband operation.

8. The method of claim 1, wherein the physical channels are Physical Resource Blocks (PRBs) or Resource Elements (REs).

9. The method of claim 1, wherein the determined frequency separation is a minimum transmit-receive carrier frequency separation.

10. A User Equipment comprising:
    a receiver; and
    a transmitter;
    wherein the User Equipment is operable to: determine a frequency separation between a frequency of a transmit signal and a frequency of a receive signal within a frequency band in a wireless communications network by selecting the frequency separation from a plurality of frequency separations that are possible for the band, based on at least one of a power of the transmit signal, a number of physical channels associated with the transmit signal, and a number of physical channels associated with the receive signal; and
    transmit and receive signals in the frequency band in accordance with the determined frequency separation;
    wherein each of the plurality of frequency separations corresponds to a predefined transmit-receive frequency separation value, and wherein the User Equipment is operable to determine the frequency separation by:
    comparing at least one of a parameter indicative of a power of the transmit signal, a parameter indicative of a number of physical channels associated with the receive signal, and a parameter indicative of a number of physical channels associated with the receive signal with a threshold; and selecting a transmit-receive frequency separation value from the plurality of predefined transmit-receive frequency separation values based on the comparison.

11. A network node comprising:
a receiver; and
a transmitter;
wherein the network node is operable to: determine a frequency separation between a frequency of a transmit signal and a frequency of a receive signal within a frequency band in a wireless communications network by selecting the frequency separation from a plurality of frequency separations that are possible for the band, based on at least one of a number of physical channels associated with the transmit signal, and a number of physical channels associated with the receive signal, and
transmit and receive signals in the frequency band in accordance with the determined frequency separation.

12. The network node of claim 11, wherein the transmit signal is an uplink signal, from a User Equipment to the network node, and the receive signal is a downlink signal, from the network node to the User Equipment, wherein the network node is further operable to signal the determined frequency separation to the User Equipment.

13. A method for transmitting and receiving signals in a frequency band in a wireless communications network, the method comprising:
determining a frequency separation between a frequency of a transmit signal and a frequency of a receive signal within the frequency band by selecting the frequency separation from a plurality of frequency separations that are possible for the band, based on at least one of a number of physical channels associated with the transmit signal and a number of physical channels associated with the receive signal; and
transmitting and receiving signals in the frequency band in accordance with the determined frequency separation.

14. The method of claim 13, wherein the transmit signal is an uplink signal, from a User Equipment to a network node, and the receive signal is a downlink signal, from the network node to the User Equipment.

15. The method of claim 14, further comprising signaling the determined frequency separation to the User Equipment.

16. The method of claim 15, wherein the signaling comprises an identifier identifying the determined frequency separation.

17. The method of claim 15, wherein the determined frequency separation is signaled to the User Equipment in Radio Resource Control (RRC) signaling or Layer 1 signaling.

18. The method of claim 15, wherein the determined frequency separation is signaled to the User Equipment as part of scheduling information.

19. The method of claim 14, wherein transmitting and receiving signals in the frequency band in accordance with the determined frequency separation comprises the network node adapting its transmitter and or receiver based on the determined frequency separation.

20. The method of claim 14, further comprising scheduling transmission of downlink data and or uplink data using the determined frequency separation.

* * * * *

UNITED STATES PATENT AND TRADEMARK OFFICE
CERTIFICATE OF CORRECTION

PATENT NO. : 11,026,229 B2  
APPLICATION NO. : 15/207182  
DATED : June 1, 2021  
INVENTOR(S) : Kazmi et al.

Page 1 of 1

It is certified that error appears in the above-identified patent and that said Letters Patent is hereby corrected as shown below:

In the Specification

In Column 21, Line 49, delete "66 f" and insert -- $\Delta f$ --, therefor.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*